United States Patent
Lamm et al.

[11] 3,803,723
[45] Apr. 16, 1974

[54] DEVICE FOR INTRODUCING A GASEOUS AGENT

[76] Inventors: Eduard Lvovich Lamm, ulitsa Konstantinova, 5, kv. 39; Galina Vasilieva Kljueva, novo-petrovskaya ulitsa, korpus 4, kv. 104; Boris Grigorievich Shteinfeld, Nizhegerodskaya ulitsa, Ia, kv. 50, all of Moscow, U.S.S.R.

[22] Filed: July 15, 1971

[21] Appl. No.: 162,796

[52] U.S. Cl. .................. 34/57 R, 159/4 R
[51] Int. Cl. .............. F26b 17/10, F26b 3/08
[58] Field of Search ....... 34/10, 57 R; 159/4 R, 4 B, 159/4 S

[56] References Cited
UNITED STATES PATENTS

| | | | |
|---|---|---|---|
| 2,911,036 | 11/1959 | Lazar et al. | 159/4 |
| 1,391,562 | 9/1921 | Miller | 159/4 B X |
| 1,964,858 | 7/1934 | Peebles | 159/4 S |
| 2,449,366 | 9/1948 | Bowen et al. | 159/4 R |
| 2,204,170 | 6/1940 | Zwilling | 159/4 S |
| 2,154,000 | 4/1939 | Zizinia et al. | 34/10 |

FOREIGN PATENTS OR APPLICATIONS

| | | | |
|---|---|---|---|
| 669,809 | 9/1963 | Canada | 159/4 J |
| 14,919 | 10/1956 | Germany | 159/4 B |
| 85,417 | 7/1957 | Netherlands | 159/4 B |

*Primary Examiner*—William F. O'Dea
*Assistant Examiner*—William C. Anderson
*Attorney, Agent, or Firm*—Eric H. Waters

[57] ABSTRACT

A device comprising a duct divided by a horizontal partition into channels, one of the channels accommodating, in the part thereof directed towards a spray dryer, the nozzles. The nozzles are cylindrical in shape in the zone of drying agent entry therein, while in the zone of drying agent exit therefrom a portion of the nozzles is inclined in relation to the generatrix of the cylinder. One nozzle is adapted to be displaced.

3 Claims, 1 Drawing Figure

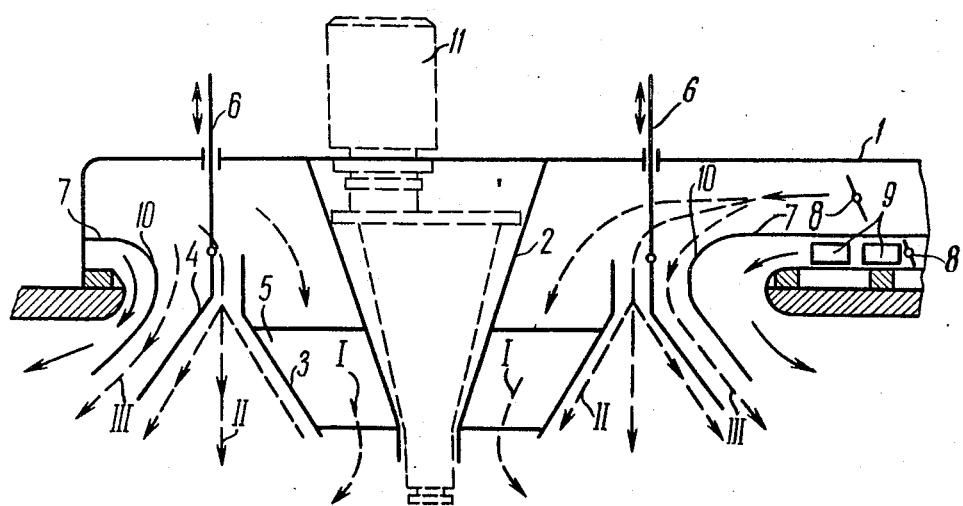

DEVICE FOR INTRODUCING A GASEOUS AGENT

This invention relates to drying equipment and, more particularly, it pertains to devices for introducing a gaseous drying agent into spray dryers.

Devices for the introduction of a gaseous drying agent into a dryer are known in the art which comprise a distributing duct made, for example, in the form of a snail and having a conical nozzle that adjoins said duct, is disposed coaxially with the dryer and serves for introducing centrally into the dryer a drying agent.

However, the fact that gaseous drying agent introduction is effected centrally precludes compensation of the injection effect produced by a high-velocity stream of the atomized product to be dried, whereby circulating streams are set up in the dryer. Said circulating streams are disadvantageous in that they cause penetration of the spent gaseous drying agent having a low temperature into the zone of fresh agent entry to the dryer and, hence, diminish the thermal drier efficiency, another detrimental effect being an incomplete utilization of the dryer volume and associated reduction in moisture removal per unit volume. A further disadvantage consists in that the circulating streams carry underdried products to the dryer walls, thereby causing the deposition of said products on said walls.

Underdried product deposition on the walls of a dryer necessitates mounting within the drier appropriate means for wall cleaning or providing externally disposed vibrators and, therefore, makes the dryer design excessively elaborate.

It will also be noted that in the prior art spray dryers the dried product is entrained by the circulating streams into the zone of fresh drying agent entry, so that the quality of the product deteriorates and said dryers are unsuitable for drying heat sensitive materials with a high-temperature gaseous drying agent.

It is an object of the present invention to eliminate or mitigate the aforementioned disadvantages.

This and other objects are accomplished by dividing a gaseous drying agent distributing duct with partitions into channels and mounting in at least one channel, in the part thereof that faces the dryer, the nozzles, which nozzles are cylindrical in shape in the zone of drying agent entry thereinto, while in the zone of drying agent exit therefrom a portion of said nozzles is inclined in relation to the generatrix of said cylindrical portion.

Provision of channels in the duct and the employment of nozzles which have the form of a cylinder in the zone of gaseous drying agent entry, while the portion of said nozzles in the zone of gaseous drying agent exit therefrom is made inclined in relation to the generatrix of said cylinder, make it possible to effect gaseous drying agent zonal feed into the dryer, the direction of gaseous drying agent feed being selected so as to compensate the injection effect produced by the high-velocity stream of the atomized product and, hence, to minimize circulating streams.

This results in enhancing the thermal dryer efficiency, increases moisture removal per unit volume in the dryer, and suppresses product deposition onto dryer walls.

It preferable preferably that one nozzle be adapted to be displaced in the direction of gaseous drying agent flow and be mounted close to the channel exit side so as to provide for controlling the flow area of said channel.

Using the nozzle adapted to be displaced makes for varying the flow area of the channel exit side and, hence, provides the possibility of controlling the velocity of gaseous drying agent at a constant flow rate thereof and of optimizing the aerodynamic conditions inside the dryer.

Some of the channels should preferably be furnished with at least one port of an adjustable flow area, said port being intended for feeding a gaseous medium having a temperature below that of the gaseous drying agent in order to decrease the temperature of said drying agent in the channels. Said port makes it possible to use a high-temperature gaseous drying agent for drying heat sensitive products and, therefore, provides for a higher thermal dryer efficiency.

The device, according to the present invention, makes for enhancing the thermal dryer efficiency, increasing moisture removal per unit volume of the dryer, minimizing the deposition of the product being dried on the dryer internal surfaces, and also for employing a high-temperature gaseous drying agent for drying heat sensitive products and yielding high-quality finished products.

Other objects and advantages of the present invention will become apparent from a consideration of the detailed description of an exemplary embodiment of the device, according to the invention, to be taken in conjunction with the accompanying drawing, wherein FIG. 1 shows schematically, in a longitudinal section, the device according to the invention for introducing a gaseous drying agent into a spray drier.

A duct 1 of the device for gaseous drying agent introduction into a dryer houses nozzles 2, 3 and 4, said nozzles having a common axis of symmetry, which axis of symmetry is simultaneously the axis of symmetry of the dryer (not shown in the drawing). The nozzle 3 is secured on the outer edges of inclined plates 5, which are welded to the external surface of the nozzle 2. The nozzle 4 is movable and can be displaced, through the agency of adjusting rods 6, in the vertical plane, thereby controlling the flow area at the channel exit and, hence, varying the velocity of the gaseous agent at a constant flow rate thereof. The nozzles 2, 3 and 4 in the zone of drying agent entry thereinto are made in the form of a cylinder, whereas the exit portion of said nozzles is inclined in relation to the generatrix of said cylinders, so that the nozzles 3 and 4 form an annular diffuser, said diffuser eliminating the circulation of the stream as it leaves the annular gap between the nozzles 2 and 3.

The duct 1 is divided by a horizontal partition 7 into an upper and a bottom channel furnished with gates 8 at the inlet side thereof, said gates 8 being intended to control the flow rate of the gaseous drying agent. Where the products to be dried are heat sensitive, cold air is supplied through ports 9 of a variable flow area, while for drying thermally stable products the ports 9 should be closed. The horizontal partition 7 gradually merges into a partition 10, which directs the gaseous drying agent stream that flows via the bottom channel to the dryer periphery.

The present device for gaseous drying agent introduction into a spray dryer functions in the following manner.

A gaseous drying agent, such as flue gases, hot air, etc., is delivered into the duct 1, in which said drying agent is distributed uniformly over the cross-sectional area of the duct. The gates 8 are used to attain the desired ratio of gaseous drying agent flow rates in the bottom and the upper channels.

The drying agent stream flows through the upper channel between the cover of the duct 1 and the horizontal partition 7 and comes to the zone of the nozzles 2, 3 and 4. Here the gaseous drying agent stream is divided into three streams, viz., internal stream I, middle stream II and external stream III, said three streams being the principal carriers of heat and providing for vigorous evaporation from moist product particles. To control the velocity and mutual distribution of the three streams, the nozzle 4 can be displaced vertically by means of adjusting rods 6.

Varying the position of the nozzle 4 results in changing the flow area of the external stream III, whereas the flow areas of the streams I and II remain constant because of the cylindrical shape of the nozzle 2 and 3 at the site of gaseous drying agent entry thereinto, so that, at a constant drying agent flow rate governed by the heat balance of a particular drying process, the velocity of the drying agent streams I, II and III would vary. The flow area of the annular channel disposed between the nozzles 3 and 4 and intended for the passage of the steam II, is selected so as to compensate the injecting effect produced by the high-velocity stream I. In the bottom part, said annular channel is diffuser-shaped in order to decelerate the stream II, thereby providing for the compensation of the suction effect produced by the emerging internal stream I. To gradually introduce the stream I of the gaseous drying agent into an atomized product jet produced by the atomizer 11, the channel of the internal stream I accommodates inclined plates 5, which are welded to the external surface of the nozzle 2.

In case the material to be dried is heat sensitive, cold air is either sucked into or force-fed to the ports 9 in order to dilute the drying agent and obtain the requisite temperature. The drying agent stream that flows through the bottom channel is deflected by the partition 10 to the periphery of the spray drier, so that the dried heat sensitive material contacts the gaseous drying agent of a lower temperature and avoids overheating. When the material to be dried is thermally stable, the ports 9 should be closed.

The present device for gaseous drying agent introduction into a spray dryer imparts versatility to spray dryers in that the dryers equipped with the device, according to the invention, are suited for drying both heat sensitive and thermally stable materials with a high-temperature gaseous drying agent and make it possible to attain a specific moisture removal of 25 to 30 kg per cu.m per hour.

We claim:

1. A device for introducing a gaseous drying agent into a spray drier, comprising a duct, nozzles which adjoin said duct and are disposed coaxially with said drier so as to form annular gaps for the passage of the drying agent; substantially horizontal partitions dividing said duct into adjacent channels in the form of a single manifold, said nozzles being provided at the exit end of said channels, at least one of said channels accommodating said nozzles in a part thereof directed towards said drier, said nozzles being cylindrical in shape in the zone of entry of the drying agent thereinto while in the zone of exit of the agent therefrom a portion of said nozzles is inclined in relation to the generatrix of said cylindrical nozzles, means for supplying the drying agent into said drier in a continuous current and at various temperatures, means for adjusting the direction and speed of the drying agent in zones, and means for accordingly varying the temperature along a stream of a sprayed product.

2. The device as defined in claim 1, wherein at least one of said nozzles is adapted to be displaced in the direction of flow of the drying agent, said one nozzle being mounted close to the exit side of said channels in order to control the flow area thereof.

3. The device as defined in claim 1, wherein part of said channels is provided with at least one port having an adjustable flow area, said one port being intended for feeding a gaseous medium at a temperature below that of the drying agent used, and also a nozzle for directing the medium to the periphery of said spray drier.

* * * * *